(12) United States Patent
Kopp et al.

(10) Patent No.: US 6,662,671 B1
(45) Date of Patent: Dec. 16, 2003

(54) GEAR DRIVEN MECHANICAL ASSEMBLY TEST PROCEDURE

(75) Inventors: Gary E. Kopp, Shelby Twp., MI (US); Gregory Paul Kopp, Macomb Twp., MI (US); Peter Jacobsen, Troy, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 10/201,163

(22) Filed: Jul. 22, 2002

(51) Int. Cl.[7] .............................................. G01M 19/00
(52) U.S. Cl. .................................... 73/865.8; 73/862.08
(58) Field of Search ........................... 73/862.08, 865.8, 73/865.9, 162

(56) References Cited

U.S. PATENT DOCUMENTS 5,113,704 A * 5/1992 Yano et al. .................... 73/162
6,047,596 A * 4/2000 Krug et al. .................... 73/162
6,170,326 B1   1/2001 Juranitch et al.
6,182,515 B1   2/2001 Juranitch et al.
6,389,888 B1 * 5/2002 Juranitch et al. .......... 73/118.1

* cited by examiner

*Primary Examiner*—Edward Lefkowitz
*Assistant Examiner*—Corey D. Mack
(74) *Attorney, Agent, or Firm*—Brinks Hofer Gilson & Lione

(57) ABSTRACT

A method of collecting test data for a gear set includes loading the gear set to a testing device having a first motor which is an input drive motor and a second motor which is an output drag motor, establishing a set-point torque value, running the drive motor at a fixed speed, measuring the output torque at the drag motor, comparing the output torque to the set-point torque, adjusting the input torque, repeating the steps of measuring the output torque at the second motor, comparing the output torque to the set-point torque, and adjusting the input torque until the output torque matches the set-point torque value, and collecting test data.

9 Claims, 3 Drawing Sheets

GEAR DRIVEN MECHANICAL ASSEMBLY TEST PROCEDURE

TECHNICAL FIELD

The present invention generally relates to a method of testing Noise, Vibration, and Harshness characteristics of a gear driven assembly.

BACKGROUND

In the automotive industry, gear sets are typically tested for Noise, Vibration, and Harshness (NVH) issues to insure satisfactory performance in the vehicle. Current gear testing methods typically test NVH characteristics of a tested gear set in terms of the speed at which the gear set is being operated. In operation within a vehicle, NVH concerns are more accurately a product of the torque that is being transferred across a gear set. Therefore, conventional testing methods which look for NVH issues relative to the speed at which the gear set is being operated do not capture the true performance characteristics of the gear set as the gear set will actually react in operation within a vehicle.

Additionally, to be thorough, both directions of the gear set must be tested. Typically, this involves stopping the test and running the gear set in the opposite direction, thereby causing the gears to engage on the opposite sides of the teeth. This typical stopping of the testing procedure and starting up in the opposite direction adds time to the testing cycle.

Further, as a gear driven assembly is being tested, the system will experience torque losses. Since the torque output will be less than the torque input by the amount of these losses, the gear set is not typically tested at the desired torque levels.

Therefore, there is a need for a method of testing a gear driven assembly which detects NVH characteristics of the gear set in terms of the torque across the gear set rather than the speed at which the gear set is being tested. Further, there is a need for a testing method which will allow both sides of the gear set to be tested in an efficient manner. And finally, there is a need for a testing method which insures that the gear set is being tested at the proper torque levels.

DETAILED DESCRIPTION OF THE PREFERRED EMBODIMENTS

The following description of the preferred embodiments of the invention is not intended to limit the scope of the invention to these preferred embodiments, but rather to enable any person skilled in the art to make and use the invention.

Figure 1:
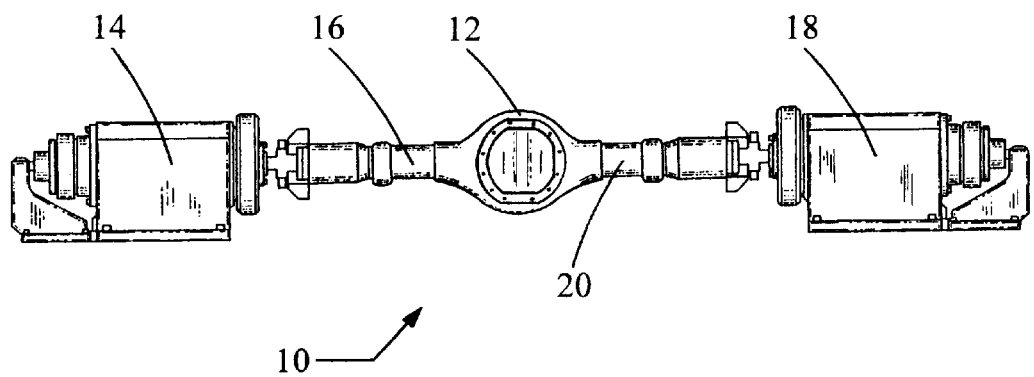
FIG. 1 is a top view of a testing device of a first preferred embodiment of the invention with a gear set mounted therein having a single input and a single output.

Referring to FIG. 1, a first preferred embodiment of a device for testing a gear set is generally shown at 10. A gear set 12 that is to be tested is positioned within the testing device 10. The device 10 includes a first motor 14 connected to an input side 16 of the gear set 12, and a second motor 18 connected to an output side 20 of the gear set 12.

The first motor 14 is a drive motor which is adapted to input rotational motion to the gear set 12. The second motor 18 is a drag motor which is adapted to create resistance to the rotation of the gear set 12, thereby increasing the torque necessary to drive the gear set 12. In operation, the drive motor 14 is powered such that the drive motor 14 provides an input torque to the gear set 12. The drag motor 18 is powered in the same direction, but slightly under-powered as compared to the drive motor 14. Since the two motors 14, 18 are connected through the gear set 12, they must run at the same speed, therefore, because the drag motor is under-powered, additional torque is generated at the drive motor 14 to bring the drag motor 18 up to the same rotational speed.

Preferably, the first motor 14 and the second motor 18 are electric motors, and the speed of the motors 14, 18 can be controlled by the amount of electric current being sent to the motor. The torque level being sent through the gear set 12 can be increased or decreased at any given speed by adjusting the power differential between the drive motor 14 and the drag motor 18.

Figure 2:
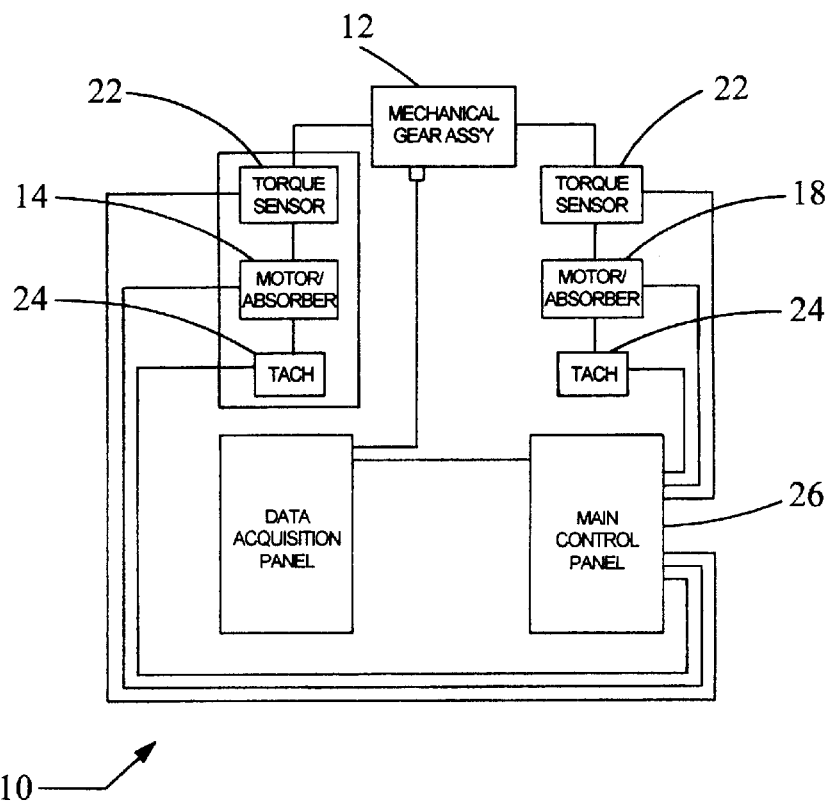
FIG. 2 is a schematic diagram of the gear testing device shown in FIG. 1.

Referring to FIG. 2, each of the motors 14, 18 includes a torque sensor 22 and a tachometer 24 to send torque and rotational speed information back to a control panel 26. The method of testing the gear set 12 includes loading the gear set 12 to the testing device 10, wherein the drive motor 14 engages the input side 16 of the gear set 12 and the drag motor 18 engages the output side 20 of the gear set 12.

Figure 3:
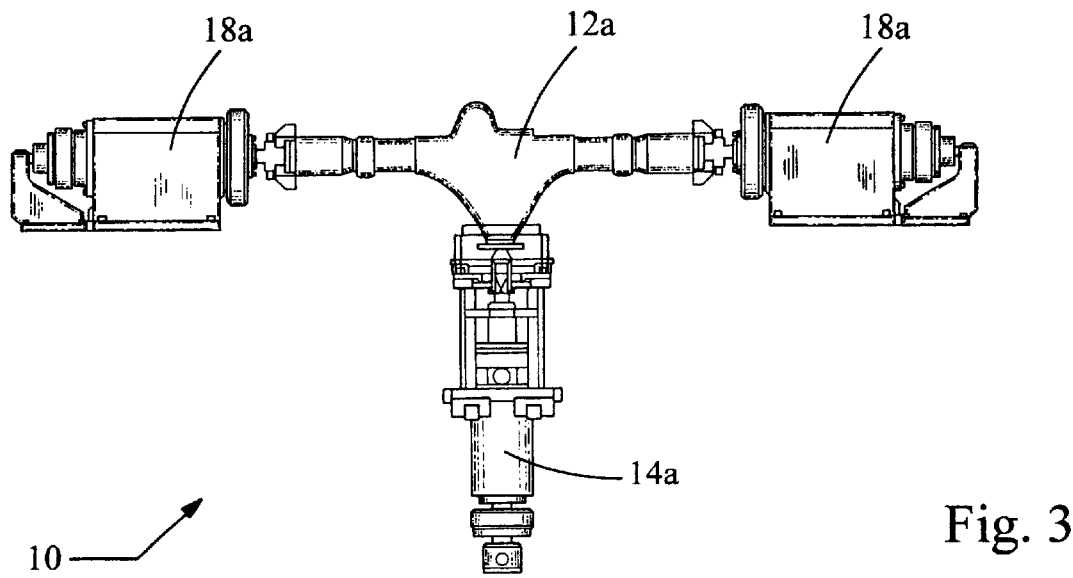
FIG. 3 is a top view of a testing device of a second preferred embodiment of the invention with a gear set mounted therein having a single input and two outputs.
Figure 4:
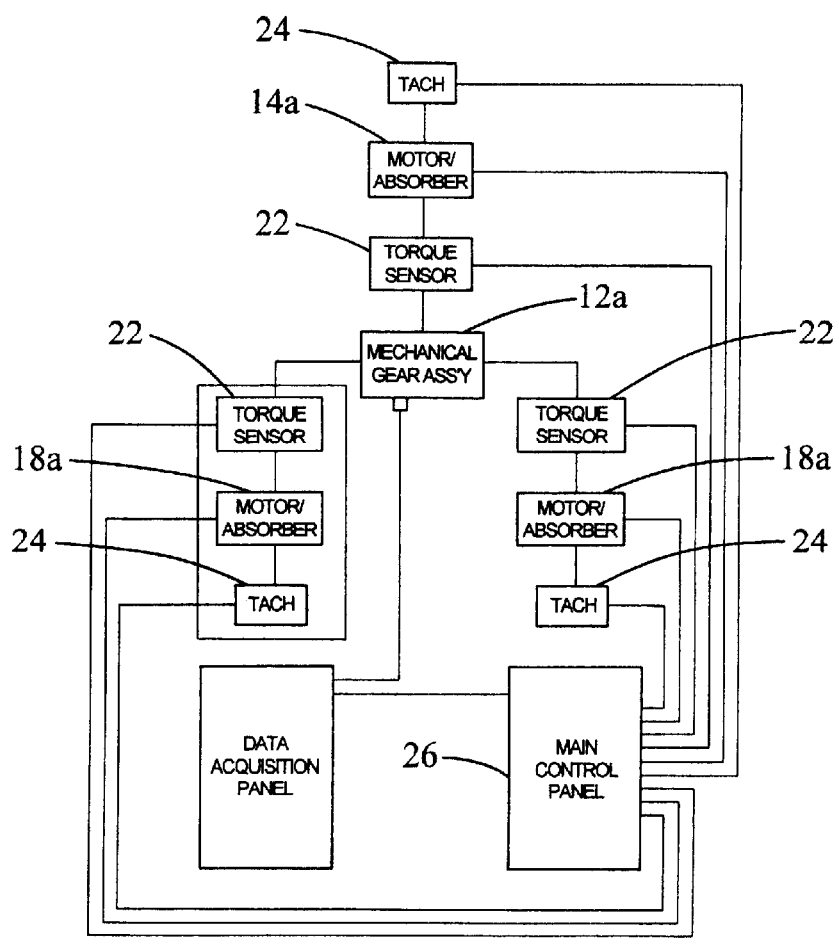
FIG. 4 is a schematic diagram of the gear testing device shown in FIG. 3.

Alternatively the gear set 12 could have one input and two outputs, such as the rear axle differential gear set 12a shown in FIG. 3. As shown in FIG. 3, the testing device 10a includes one input drive motor 14a and two output drag motors 18a. When there is more than one output from the gear set 12a the output drag motors 18a are preferably synchronized to insure that the torque transfer through the gear set is evenly split between the two drag motors 18a. Similar to the testing device having one input and one output, each of the motors 14a, 18a of the testing device shown in FIG. 3 includes a torque sensor 22 and a tachometer 24 to send torque and speed information back to a control panel 26, as shown in FIG. 4.

Once the gear set 12 is loaded to the testing device 10, a set point torque value is then established. The set-point torque value is the level of torque at which the gear set 12 is to be tested. The first motor 14 is then powered at a constant speed and the torque is measured at the second motor 18. The torque at the second motor 18 is compared to the set-point torque, and the torque being input by the first motor 14 is adjusted appropriately to bring the torque at the second motor 18 closer to the set-point torque level.

This comparison and feedback is necessary to compensate for the torque losses within the gear driven assembly 12. If the test is conducted based upon the input torque, then the torque losses within the gear driven assembly 12 are not compensated for, and the test will be performed at lower torque levels than the test data indicates, thereby giving inaccurate data. The steps of measuring and comparing the torque at the second motor 18 to the set-point torque, and adjusting the torque at the first motor 14 are repeated until the torque at the second motor 18 matches the set-point torque value. Once the torque at the second motor 18 matches the set-point torque value, then NVH data is collected for the gear set 12.

The testing is performed at constant speed. The torque being transferred through the gear set 12 can be adjusted by controlling the power supplied to the first and second motors 14, 18. Because NVH conditions are torque dependent within the vehicle, it is preferable to run the tests at constant speed so the data collected is relative to the torque levels.

To fully test the gear set 12, it is preferable to test the engagement of the gears on both sides, therefore, the direction of the torque transfer through the gear set 12 is be reversed. The direction is reversed because when the gear set 12 runs in one direction, the gear teeth of the gears engage one another on one side. When the direction of torque transfer is reversed, the gear teeth engage one another on the opposite side.

Preferably, each of the first and second motors 14, 18 are capable of running either as a drive motor or a drag motor. In that way, the direction of torque transfer through the gear set 12 can be reversed without having to shut down the test. In order to switch, power to the first motor 14 is reduced until the second motor 18 becomes the driving motor at which time the gears alternate drive/driven positions and the gear teeth will engage on opposite sides. Once the second motor 18 becomes the drive motor, the testing is continued in the same fashion as when the first motor 14 was the drive motor. This will allow the reversal of the torque transfer without requiring the test to be shut down, thereby shortening the cycle time of the test. Alternatively however, the test could be performed with reversible motors, wherein the test is shut down, the motors are reversed, and the testing is resumed.

One variation of the testing procedure is to simply test the gear set 12 at a single constant speed and a single constant torque. Preferably however, test data is collected over a range of set-point torque values such that data can be collected for the gear set 12 in a variety of running conditions as experienced under normal usage. One way of accomplishing this is by establishing a plurality of discreet set-point values which extend over a given range. Preferably, the set point values are taken at approximately 10 ft. lb. intervals, however the set-point values can be spaced across the given range in any way suitable for the test.

As the test is conducted, the input torque from the first motor 14 is stepped from one set-point torque to the next. The torque vs. time graph for this stepping process is shown at 28 in FIG. 5. At each set-point value, the torque at the second motor 18 is compared to the set-point value, and the input torque is adjusted until the torque at the second motor 18 matches that particular set-point value. At that time, NVH data for the gear set 12 is collected for that particular set-point value. Once the date at a particular set-point value is collected, the torque level is stepped up to the next set-point level.

Figure 5:
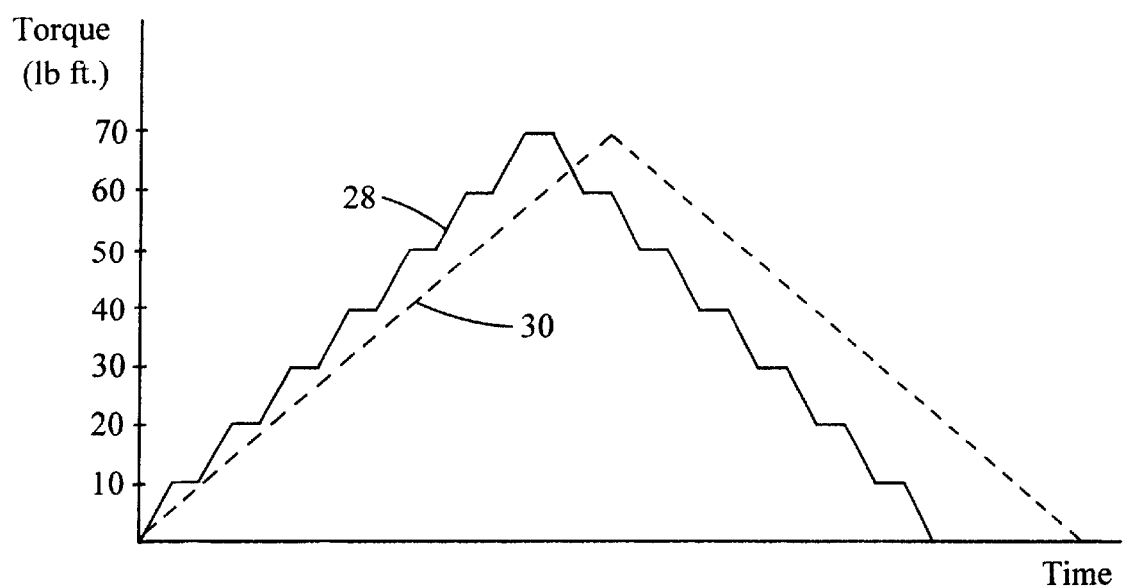
FIG. 5 is a Torque vs. Time diagram illustrating a first testing procedure where the torque is stepped and a second testing procedure where the torque is continuously varied.

Alternatively, the torque being transferred through the gear set 12 can vary continuously as shown at 30 in FIG. 5. In this instance, data is collected instantaneously each time the torque measured at the second motor 18 matches one of the discreet set-point values.

The foregoing discussion discloses and describes the preferred embodiments. One skilled in the art will readily recognize from such discussion, and from the accompanying drawings and claims, that changes and modifications can be made to the preferred embodiments without departing from the scope of the inventive concepts as defined in the following claims. The preferred embodiments have been described in an illustrative manner, and it is to be understood that the terminology which has been used is intended to be in the nature of words of description rather than of limitation.

What is claimed is:

1. A method of collecting test data for a gear set including:
    loading the gear set to a testing device having a first motor which is an input drive motor and a second motor which is an output drag motor;
    establishing a set-point torque value;
    powering the drive motor at a substantially constant rotational speed to supply an input torque to the gearset;
    measuring the output torque at the drag motor;
    comparing the output torque to the set-point torque;
    adjusting the input torque until the measured output torque substantially equals the set-point torque value, while keeping the rotational speed of both the drive and drag motors substantially constant; and
    collecting test data.

2. The method of claim 1 wherein test data is collected at constant speed and constant torque.

3. The method of claim 1 wherein establishing a set-point torque value includes establishing a plurality of discreet set-point torque values extending over a given range, the method including adjusting the input torque until the measured output torque substantially equals the set-point torque value, while keeping the rotational speed of both the drive and drag motors substantially constant and collecting test data at each of the plurality of discreet set-point values over the given range.

4. The method of claim 3 wherein adjusting the input torque until the output torque matches the set-point torque value includes stepping the input torque between the discreet set-point torque values and further adjusting the input torque until the output torque matches the set-point torque value.

5. The method of claim 3 wherein adjusting the input torque until the output torque matches the set-point torque value includes continuously varying the output torque over the given range of set-point values and collecting test data at each of the plurality of discreet set-point values over the given range includes collecting data instantaneously each time the measured output torque matches one of the discreet set-point values.

6. The method of claim 3, wherein data is collected at substantially the same rotational speed at each discreet set-point value.

7. The method of claim 1 wherein the first and second motors are each capable of running as a drive motor and a drag motor in the same direction, the method including:
    switching the first motor to a drag motor and switching the second motor to a drive motor;
    establishing a set-point torque value;
    powering the drive motor at a fixed speed to supply an input torque to the gearset;
    measuring the output torque at the drag motor;
    comparing the output torque to the set-point torque;
    adjusting the input torque until the measured output torque substantially equals the set-point torque value, while keeping the rotational speed of both the drive and drag motors substantially constant; and
    collecting test data.

8. The method of claim 1 wherein the drive motor and the drag motor are reversible motors, the method including:
    stopping the test and reversing both the drive motor and the drag motor to effectively change the drive motor to a drag motor and to effectively change the drag motor to a drive motor;

establishing a set-point torque value;

powering the drive motor at a fixed speed to supply an input torque to the gearset;

measuring the output torque at the drag motor;

comparing the output torque to the set-point torque;

adjusting the input torque until the measured output torque substantially equals the set-point torque value, while keeping the rotational speed of both the drive and drag motors substantially constant; and collecting test data.

9. The method of claim 1 wherein the gear set has one input and two outputs and the testing device includes an input drive motor and two output drag motors, measuring the output torque at the drag motor includes measuring the output torque at each drag motor, and comparing the output torque to the set-point torque includes comparing the output torque of each drag motor to the set-point torque, the method further including synchronizing the drag motors such that the torque split within the gear set between the two drag motors is even.

* * * * *